(12) United States Patent
Hughes et al.

(10) Patent No.: US 7,155,572 B2
(45) Date of Patent: Dec. 26, 2006

(54) METHOD AND APPARATUS FOR INJECTING WRITE DATA INTO A CACHE

(75) Inventors: William A. Hughes, San Jose, CA (US); Patrick Conway, Los Altos, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 273 days.

(21) Appl. No.: 10/353,216

(22) Filed: Jan. 27, 2003

(65) Prior Publication Data

US 2004/0148473 A1 Jul. 29, 2004

(51) Int. Cl.
*G06F 12/08* (2006.01)

(52) U.S. Cl. .................. 711/122; 711/152; 711/138; 710/27; 710/38

(58) Field of Classification Search ............... 711/140, 711/141, 152, 113, 122, 138, 167; 710/38, 710/27
See application file for complete search history.

(56) References Cited

U.S. PATENT DOCUMENTS

| | | | |
|---|---|---|---|
| 4,197,580 A | | 4/1980 | Chang et al. |
| 5,375,216 A | | 12/1994 | Moyer et al. |
| 5,535,116 A | | 7/1996 | Gupta et al. |
| 5,553,265 A | | 9/1996 | Abato et al. |
| 5,680,576 A | | 10/1997 | Laudon |
| 5,727,150 A | | 3/1998 | Laudon et al. |
| 5,829,025 A | * | 10/1998 | Mittal .................. 711/122 |
| 5,829,028 A | | 10/1998 | Lynch et al. |
| 5,850,534 A | * | 12/1998 | Kranich ................ 711/144 |
| 5,996,048 A | * | 11/1999 | Cherabuddi et al. ........ 711/122 |
| 6,101,574 A | * | 8/2000 | Kumasawa et al. ......... 711/113 |
| 6,212,568 B1 | | 4/2001 | Miller et al. |
| 6,223,258 B1 | | 4/2001 | Palanca et al. |
| 6,427,188 B1 | * | 7/2002 | Lyon et al. .................. 711/122 |
| 6,442,666 B1 | | 8/2002 | Stracovsky |
| 6,490,654 B1 | | 12/2002 | Wickeraad et al. |
| 6,502,171 B1 | | 12/2002 | Arimilli et al. |
| 6,549,961 B1 | | 4/2003 | Kloth |
| 6,654,953 B1 | * | 11/2003 | Beaumont et al. ........ 717/158 |
| 6,751,684 B1 | | 6/2004 | Owen et al. |
| 6,823,429 B1 | * | 11/2004 | Olnowich .................. 711/141 |
| 6,839,816 B1 | * | 1/2005 | Borkenhagen et al. ...... 711/152 |
| 2002/0087796 A1 | | 7/2002 | Fanning |
| 2003/0154350 A1 | * | 8/2003 | Edirisooriya et al. ....... 711/141 |

(Continued)

FOREIGN PATENT DOCUMENTS

EP 0468766 7/1991

(Continued)

OTHER PUBLICATIONS

HyperTransport I/O Link Specification, Revision 1.03, HyperTransport Technology Consortium, Oct. 10, 2001, Chapter 3, p. 26-28.*

(Continued)

*Primary Examiner*—Pierre-Michel Bataille
(74) *Attorney, Agent, or Firm*—Larson, Newman, Abel Polansky & White LLP

(57) ABSTRACT

A data processing system (100, 600) has a memory hierarchy including a cache (124, 624) and a lower-level memory system (170, 650). A data element having a special write with inject attribute is received from a data producer (160, 640), such as an Ethernet controller. The data element is forwarded to the cache (124, 624) without accessing the lower-level memory system (170, 650). Subsequently at least one cache line containing the data element is updated in the cache (124, 624).

43 Claims, 10 Drawing Sheets

U.S. PATENT DOCUMENTS

| | | | |
|---|---|---|---|
| 2003/0163649 A1* | 8/2003 | Kapur et al. | 711/146 |
| 2004/0019704 A1* | 1/2004 | Sano et al. | 709/252 |
| 2004/0034747 A1* | 2/2004 | Rowlands et al. | 711/148 |
| 2004/0128450 A1* | 7/2004 | Edirisooriya et al. | 711/141 |

FOREIGN PATENT DOCUMENTS

| | | |
|---|---|---|
| EP | 0838762 | 2/1993 |
| EP | 000681241 A1 * | 5/1994 |
| WO | WO 00/38069 A | 6/2000 |

OTHER PUBLICATIONS

"Multiprocessor Cache Coherency:MOESI Model Describes Snooping Protocol" Microprocessor Report, M. Thorson,Jun. 20, 1990, v4, n11, p. 12(4).*

"The Computer Science and Engineering Handbook", Allen B. Tucker et al, 1997, CRC Press, p. 436-438.*

Horwitz et al., "Generating Editing Environments Based on Relations and Attributes", ACM, pp. 577-608, Oct. 1986.*

"Next Generation Packet Processing: RM9000x2™ Integrated Multiprocessor with Hypertransport™", Rob Reiner, Platform Conference, PMC-Sierra, Jan. 23-24, 2002, pp. 1-17.

"Cache-Coherent Distributed Shared Memory: Perspectives on Its Development and Future Challenges", John Hennessy, Mark Heinrich, and Anoop Gupta, Proceedings of the IEEE, vol. 87, No. 3, Mar. 1999, pp. 418-429.

"An Evaluation of Directory Schemes for Cache Coherence", Anant Agarwal, Richard Simoni, John Hennessy, and Mark Horowitz, Computer Systems Laboratory, Stanford University, IEEE 1988, pp. 280-289.

HyperTransport Technology Consortium; HyperTransport I/O Link Specification, REvision 1.03; Oct. 10, 2001; pp. 17-21.

"Keeping Secrets in Hardware: The Microsoft XBox Case Study," Andrew "Bunnie" Huang, May 26, 2002.

U.S. Appl. No. 10/261,642, filed Sep. 30, 2002.

"Cache Coherence Protocols: Evaluation Using a Multiprocessor Simulation Model," Acm Transations on Computer Systems, Association for Computing Machinery, New York, vol. 4, No. 4, Nov. 1, 1986, ISSN: 0734-2071, p. 281, line 21—p. 282, line 21.

* cited by examiner

| Bit-Time | 7 | 6 | 5 | 4 | 3 | 2 | 1 | 0 |
|---|---|---|---|---|---|---|---|---|
| 0 | SeqID[3:2] | | | | Cmd[5:0] | | | |
| 1 | PassPW | SeqID[1:0] | | | UnitID[4:0] | | | |
| 2 | COMMAND-SPECIFIC | | | | | | | |
| 3 | COMMAND-SPECIFIC | | | | | | | |
| 4 | Addr[15:8] | | | | | | | |
| 5 | Addr[23:16] | | | | | | | |
| 6 | Addr[31:24] | | | | | | | |
| 7 | Addr[39:32] | | | | | | | |

400

METHOD AND APPARATUS FOR INJECTING WRITE DATA INTO A CACHE

CROSS REFERENCE TO RELATED COPENDING APPLICATION

Related subject matter is contained in copending U.S. patent application Ser. No. 10/261,642, filed Sep. 30, 2002, entitled "Method and Apparatus for Reducing Overhead in a Data Processing System with a Cache" invented by Patrick Conway and assigned to the assignee hereof.

TECHNICAL FIELD

The present invention generally relates to data processing systems, and more specifically to data processing systems with caches.

BACKGROUND ART

A known way to increase the performance of a computer system is to include a local, high-speed memory known as a cache. A cache increases system performance because there is a high probability that once the central processing unit (CPU) accesses a data element at a particular address, its next access will be to an adjacent address. The cache fetches and stores data that is located adjacent to the requested piece of data from a slower, main memory or lower-level cache. In very high performance computer systems, several caches may be placed in a hierarchy. The cache that is closest to the CPU, known as the upper-level or "L1" cache, is the highest-level cache in the hierarchy and is generally the fastest. Other, generally slower caches are then placed in descending order in the hierarchy starting with the "L2" cache, etc., until the lowest level cache that is connected to main memory.

A cache follows certain policies when storing and discarding data. For example, many processors follow an "allocate-on-write" policy that dictates that the cache line corresponding to memory locations that are written by the CPU will be stored in the cache. Typically caches follow a policy known as least-recently-used (LRU) to determine which location to discard to make room for a new data element once all locations have been filled.

Caches typically contain multiple status bits to indicate the status of the cache line to maintain data coherency throughout the system. One common coherency protocol is known as the "MOESI" protocol. According to this protocol each cache line includes status bits to indicate which MOESI state the line is in, including bits that indicate that the cache line has been modified (M), that the cache line is exclusive (E) or shared (S), or that the cache line is invalid (I). The Owned (O) state indicates that the line is modified in one cache, that there may be shared copies in other caches and that the data in memory is stale.

In a typical configuration all caches are combined with the CPU in the same integrated circuit and main memory is located off-chip. Main memory is the slowest and least expensive memory in the system and may be constructed of inexpensive but relatively slow dynamic random access memory (DRAM) chips. This characteristic results in bottlenecks in accessing the off-chip DRAM main memory and it is desirable to avoid these bottlenecks whenever possible. Furthermore in recent years microprocessor speeds have increased faster than DRAM access speeds, compounding the bottleneck problem, the so-called "memory wall". What is needed then is a method and a data processor which can reduce the main memory access requirements in order to improve system performance. Such a method and data processor are provided by the present invention, whose features and advantages will become more clearly understood from the following detailed description taken in conjunction with the accompanying drawings.

SUMMARY OF THE INVENTION

The present invention provides, in one form, a method for use in a data processing system having a memory hierarchy including a cache and a lower-level memory system. A data element having a special write with inject attribute is received from a data producer. The data element is forwarded to the cache without accessing the lower-level memory system. Subsequently at least one cache line containing the data element is updated in the cache.

In another form the present invention provides a method for use in a data processing system having a plurality of nodes each including a central processing unit and an associated cache. A write with inject packet having a data element associated therewith is received from a data producer. A directory is checked to see if the data element is already present in the directory in a predetermined state. If the data element is not present in said directory in the predetermined state, a directory entry is created for the data element and the data element is written to a lower-level memory system. If the data element is already present in the directory in the predetermined state, the data element is forwarded to a cache that is the owner of the data element without accessing the lower-level memory system.

In still another form the present invention provides a data processor having a central processing unit including a cache, a host bridge, and a memory controller. The central processing unit is adapted to initiate a prefetch read in response to receiving a probe prefetch. The host bridge is coupled to the central processing unit and is adapted to receive a write with inject packet for a data element from a data producer. The memory controller is coupled to the central processing unit and to the host bridge and is adapted to be coupled to a lower-level memory system, and has an output coupled to the central processing unit. The memory controller includes a buffer and stores the data element from the host bridge in the buffer. The memory controller provides the probe prefetch to the central processing unit in response to receiving the data element, and provides the data element from the buffer in response to the prefetch read from the central processing unit.

In yet another form the present invention provides a data processor comprising a central processing unit including a cache, a host bridge, and a directory/memory controller. The host bridge is coupled to the central processing unit and is adapted to receive a write with inject packet for a data element from a data producer. The directory/memory controller is coupled to the central processing unit and to the host bridge and is adapted to be coupled to a lower level memory system, and has an output coupled to the central processing unit. The directory/memory controller is responsive to the write with inject packet to check a directory thereof to see if a cache state of a line associated with the data element is in a predetermined state. If so, the directory/memory controller sends the data element to the central processing unit for storage in the cache without accessing the lower level memory system.

In still another form the present invention provides a data processor comprising a central processing unit including a cache, a host bridge, and means for forwarding. The host bridge is coupled to the central processing unit and is adapted to receive a write with inject packet for a data element from a data producer. The means for forwarding is coupled to the central processing unit, the host bridge, and a lower-level memory system, and forwards the data element to the central processing unit for storage in the cache without accessing the lower-level memory system.

BRIEF DESCRIPTION OF THE DRAWINGS

The present invention will hereinafter be described in conjunction with the appended drawing figures, wherein like numbers denote like elements, and.

DETAILED DESCRIPTION OF THE DRAWINGS

Figure 1:
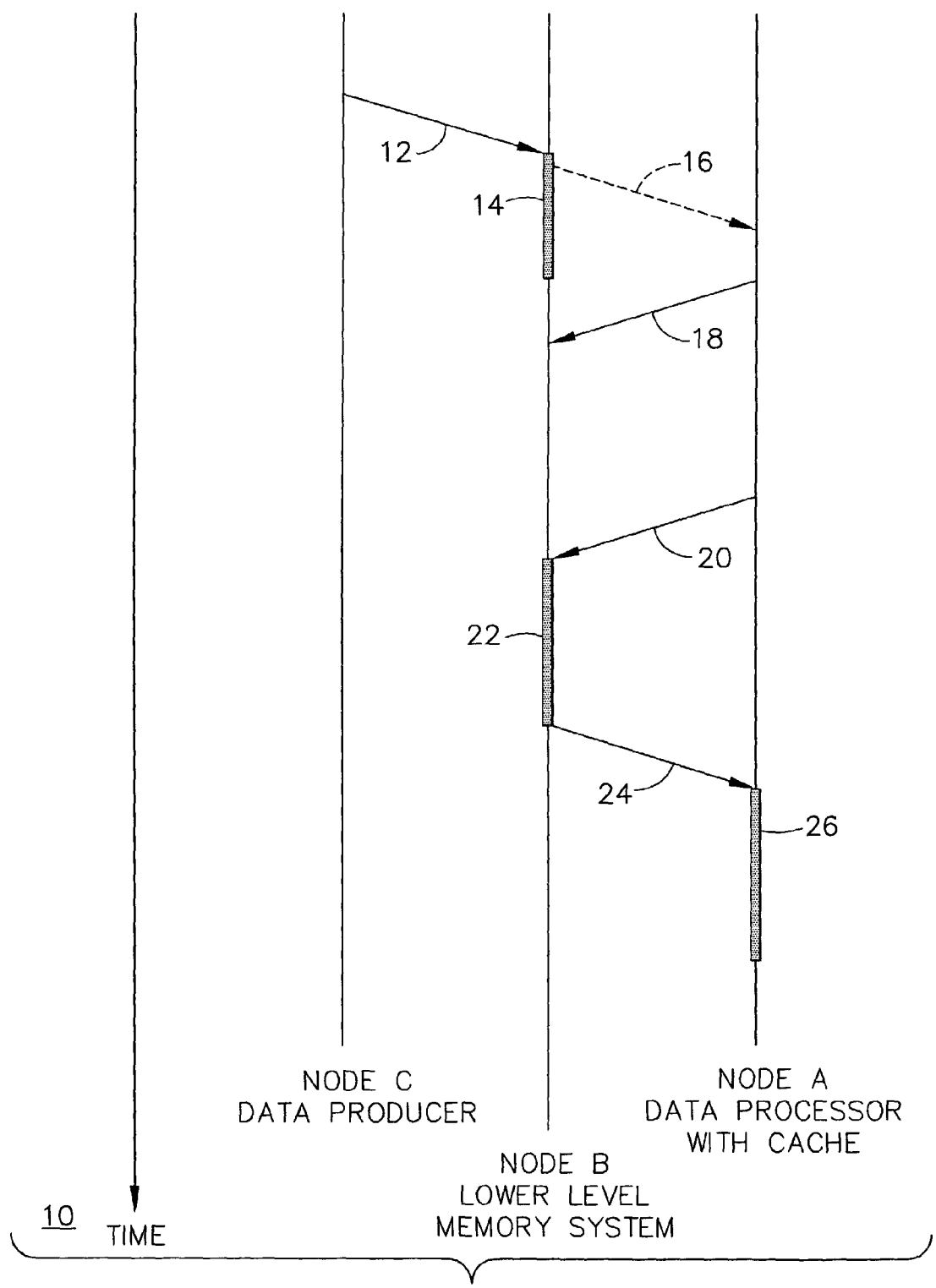
FIG. 1 illustrates a timing diagram associated with the flow of data and control signals in a probe-based data processing system known in the prior art.

FIG. 1 illustrates a timing diagram 10 associated with the flow of data and control signals in a probe-based data processing system known in the prior art. As shown in FIG. 1 the vertical axis represents time in which time flows from top to bottom. FIG. 1 depicts three devices (nodes) as vertical lines distributed along the horizontal direction. A first node, labeled "NODE C", is a data producer. For example, NODE C may correspond to an input/output device such as a receiver of a data communications channel. For this example NODE C may have an associated direct memory access (DMA) controller to assist the flow of data. A second node, labeled "NODE B", is a lower-level memory system and includes main memory and possibly one or more lower-level caches. A third node labeled "NODE A" is a data consumer having a cache, such as a central processing unit running an application program. In the data communications context, NODE C would receive data in frames and store the data in memory at NODE B to thereby make it available to the processor at NODE A where it will be used as dictated by the application program.

The flow of data and control signals will now be described. First the I/O device at NODE C receives a data frame over its communication link. The associated DMA controller at NODE C writes the data for the data frame by performing a DMA write operation to a memory location as represented by an arrow 12. During a time period 14 the memory controller at NODE B writes the data to the memory and simultaneously issues an invalidating probe to NODE A as indicated by an arrow 16. This invalidating probe informs the cache at NODE A that the data will be modified, and if NODE A has a copy of the associated cache line or lines it will put it or them into the invalid state. NODE A responds with a probe response, as indicated by an arrow 18. Later the application software running on NODE A will initiate a read request for the data, as represented by line 20. The memory controller at NODE B reads the data during a time period 22, after which time it provides the data to NODE A as shown by arrow 24. Finally NODE A completes the cache line fill during a time period 26.

Note that this conventional operation requires one write and one read to main memory and thus occupies the main memory bus during the time periods 14 and 22, respectively. For a system implementing a high-bandwidth communication protocol this operation would be repeated frequently, consuming a significant portion of the available bandwidth. In recent years main memory speeds have increased but not as fast as processor speeds and a reduction in the main memory bus bandwidth required for this operation would be desirable.

Figure 2:
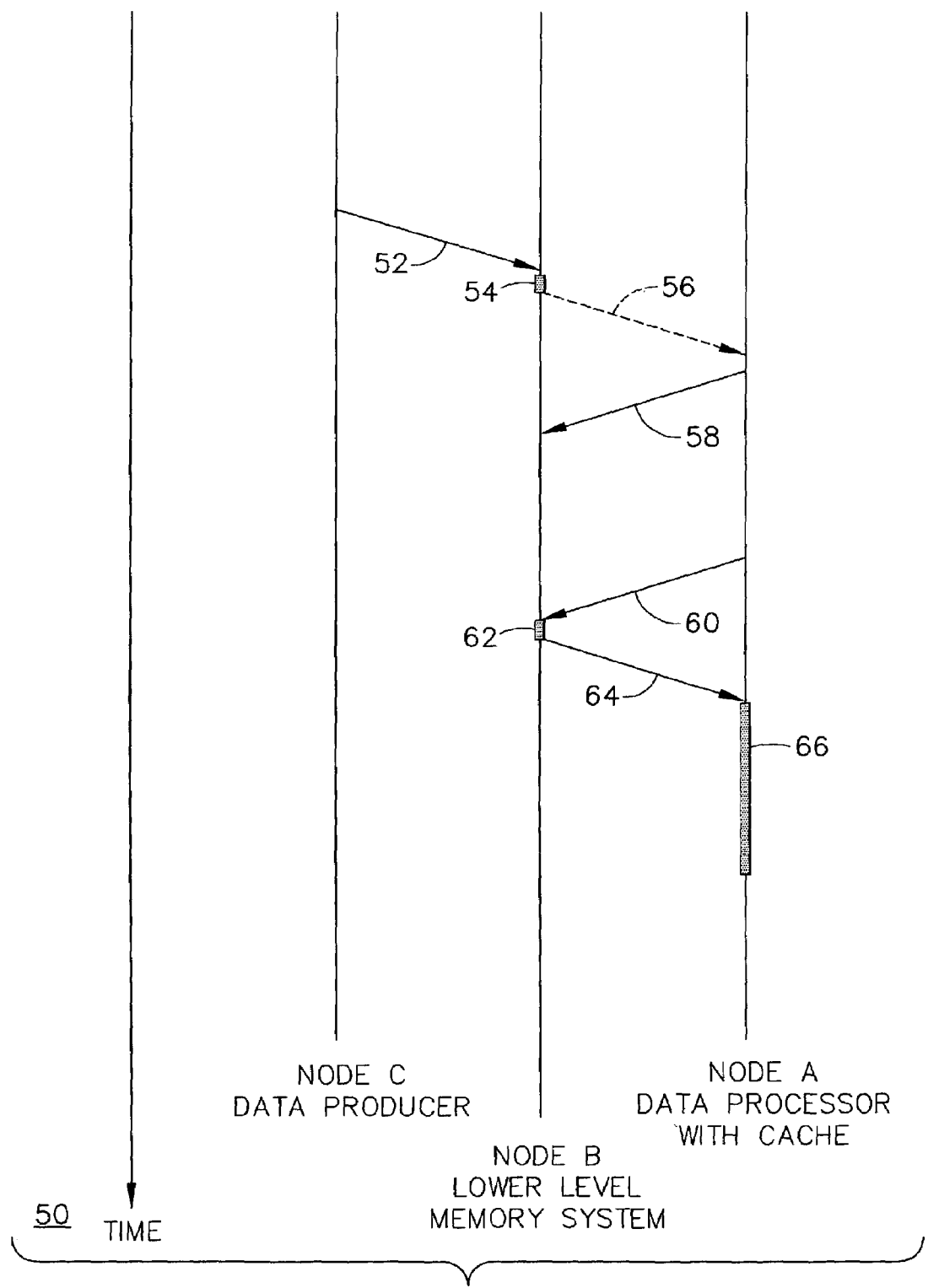
FIG. 2 illustrates a timing diagram associated with the flow of data and control signals in a probe-based data processing system according to the present invention.

To decrease main memory bus bandwidth requirements the inventors realized that the communication operation is a special case in which the data can be operated upon solely within the processor's cache, avoiding the need to store data to main memory at all. More particularly data communication receive buffers are typically circular buffers in memory to which the data producer writes data and from which an input/output driver reads protocol header information (consumer 1) and the applications program reads payload data (consumer 2). In order to avoid storing the data in main memory the inventors have devised a method and a corresponding data processing system to signal such a condition and prevent the accesses to main memory from occurring at all. It can be implemented with a simple modification of a data processor to recognize a special write with inject attribute in a received data packet and respond to it by suppressing the main memory access and forwarding the data directly to the CPU's cache and putting the cache line in a certain state. Such a method can be understood with reference to FIG. 2, which illustrates a timing diagram 50 associated with the flow of data and control signals in a probe-based data processing system according to the present invention. As with respect to FIG. 1, the vertical axis represents time in which time flows from top to bottom, and the horizontal axis depicts the same three nodes described above.

The operation commences with a special DMA write request 52 known as a "WRITE WITH INJECT" packet between the I/O device at NODE C and the memory controller at NODE B. In response to this special write request the memory controller at NODE B performs a directory read during a time period 54 and then sends a broadcast probe prefetch, also known as a snoop prefetch, represented by an arrow 56 to NODE A and all other processors in the system to inform them of the presence of data to be injected into the cache at NODE A. NODE A, which has already allocated the memory address to its local cache, responds with a probe response indicated by an arrow

58. Data is held in a store buffer at the memory controller and writing to the lower level memory system is delayed. Later the data processor at NODE A sends a prefetch read to NODE B as represented by an arrow 60. The memory controller of NODE B responds by reading the data element from the store buffer during a time period 62, and sending the data to NODE A as represented by an arrow 64. If the data processor at NODE A is able to send the prefetch read normally, the memory controller at NODE B will be able to send the data without accessing main memory at all. However if the memory controller at NODE B needs to re-use the store buffer for another purpose, such as to satisfy a normal write request when all other buffers are full before the processor sends the prefetch read, then the memory controller will write the data to memory instead. Finally NODE A completes the cache line fill during a time period 66. When the data is subsequently used on NODE A, the cache line will be available for de-allocation during the normal flow of processing using the cache's de-allocation policy, such as least recently used. Since the data element is used by the processor only once, the line will not be modified in the cache and there will be no need to write the line back to main memory. Thus this method normally eliminates any writes to main memory and only consumes a small amount of bandwidth to the memory controller at NODE B to perform the directory read and read buffer operations.

Figure 3:
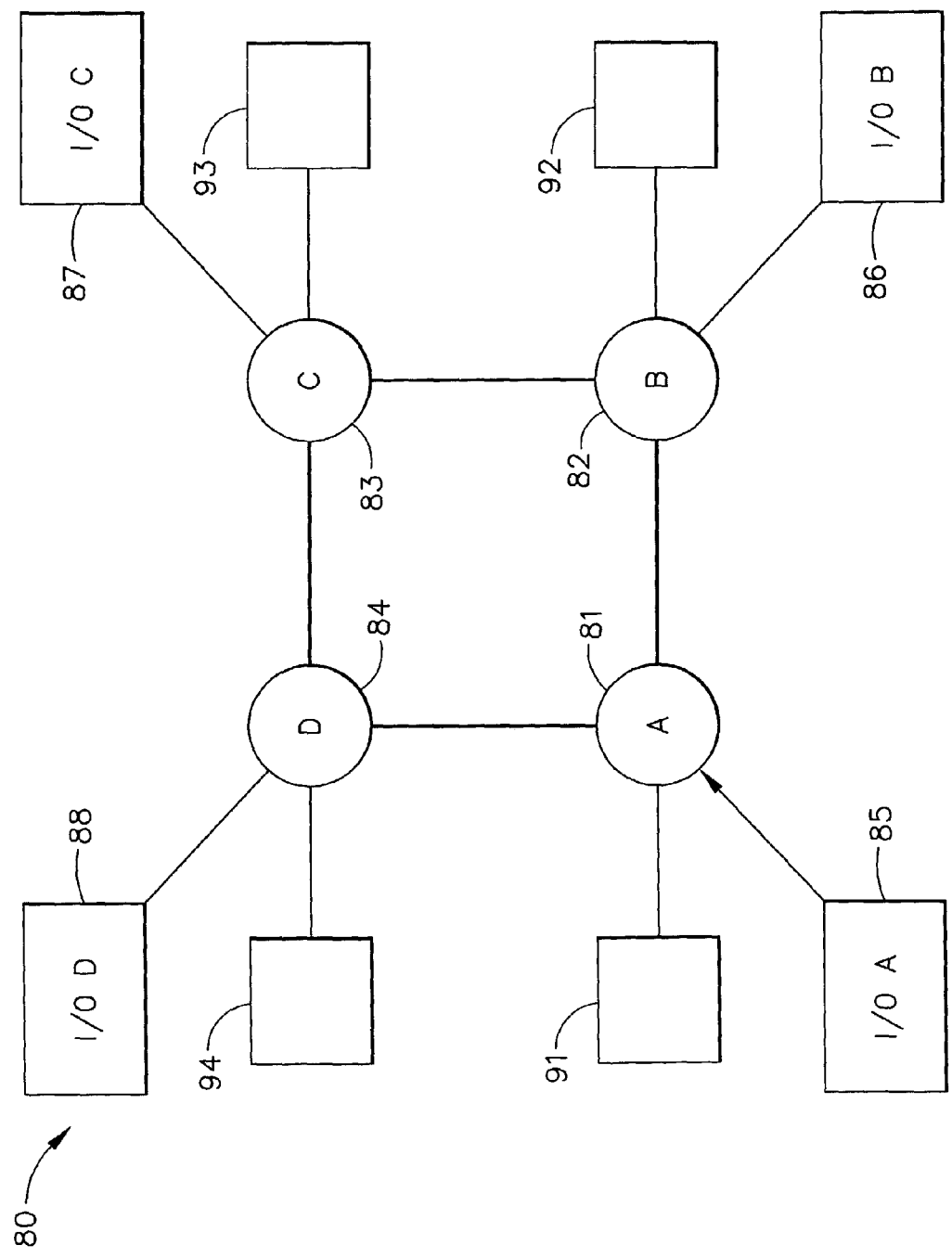
FIG. 3 illustrates a block diagram of a probe-based data processing system having multiple processors according to the present invention.

FIG. 3 illustrates a block diagram of a probe-based data processing system 80 having multiple processors according to the present invention. Data processing system 80 includes single processors 81–84 labeled "A", "B", "C", and "D", respectively, connected in a ring fashion using the so-called coherent form of the HyperTransport communication protocol. As shown in FIG. 3 processors 81–84 have corresponding data producers in the form of I/O controllers 85–88 associated therewith, labeled "I/O A", "I/O B", "I/O C", and I/O D", respectively, coupled to a respective one of processors 81–84 in a direct fashion using the so-called non-coherent form of the HyperTransport protocol. Further associated with each of processors 81–84 are local memories 91–94. The HyperTransport protocol allows the processing to be distributed at various points around the ring. For example, I/O controller 87 may initiate a WRITE WITH INJECT operation to its associated local processor 83, and the memory controller at the home node in processor 83 sends a probe not only for the data in its local cache but, using coherent HyperTransport, for all caches in the system. In another example, the I/O driver or application may be running on another processor 81 and the home node for the data may be yet another processor such as processor 82. As shown in FIG. 3, I/O controller 87 may be the one that actually sends a WRITE WITH INJECT packet to processor 83.

Figure 4:
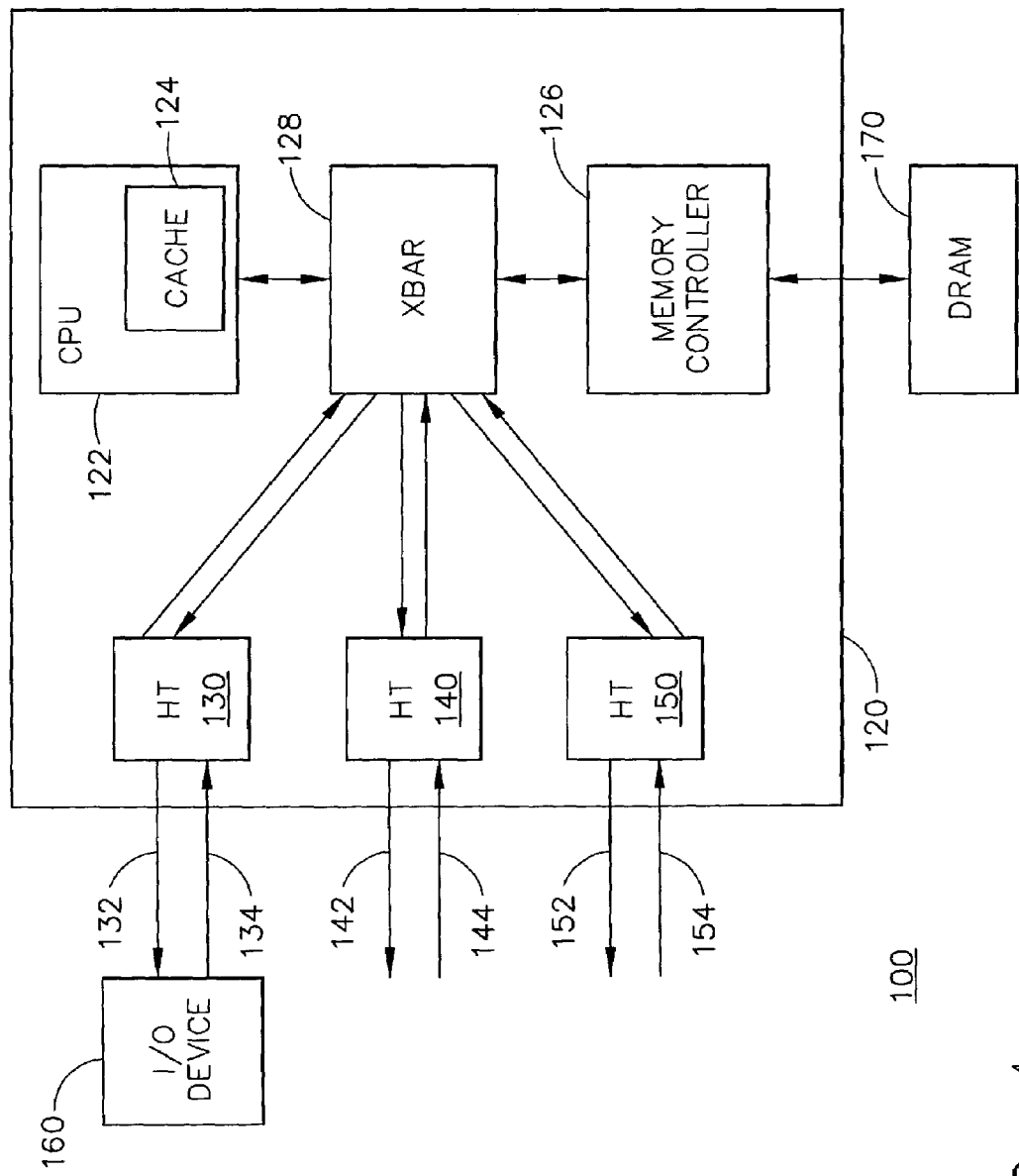
FIG. 4 illustrates a block diagram of a probe-based data processing system having a single processor according to the present invention.

FIG. 4 illustrates a block diagram of a probe-based data processing system 100 having a single processor according to the present invention. Data processing system 100 includes generally a data processor in the form of a single-chip microprocessor 120, an input/output (I/O) device 160, and a dynamic random access memory (DRAM) 170. Microprocessor 120 includes generally a central processing unit (CPU) 122, a memory controller 126, a crossbar switch labeled "XBAR" 128, and three host bridges 130, 140, and 150 each labeled "HT" for HyperTransport, described more fully below. CPU 122 is a processor adapted to execute instructions of the so-called x86 instruction set. The x86 instruction set is based on the instruction set of the 8086 microprocessor first manufactured by Intel Corporation of Santa Clara, Calif. CPU 122 however includes many sophisticated functions for high-performance execution of x86 programs including pipelining and superscalar design. CPU 122 includes at least one cache 124 for storage of frequently used data. In a preferred form CPU actually includes two L1 caches, one for instructions and the other one for data, and an L2 cache that is shared by the instruction and data streams. In this form the shared L2 cache will store the data provided with the WRITE WITH INJECT attribute. However the invention is applicable to any CPU having at least one cache.

Memory controller 126 is the mechanism for data transfer between microprocessor 120 and DRAM 170. Memory controller 126 offloads the task of initiating and terminating memory accesses from CPU 122. It includes internal queues to allow efficient use of the external bus to DRAM 170. In other embodiments DRAM 170 could be replaced by a lower-level memory system including one or more additional caches and main memory, by static RAM, by non-volatile memory, etc.

XBAR 128 is a switching/multiplexing circuit designed to couple together the buses internal to microprocessor 120.

Host bridges 130, 140, and 150 are coupled to devices external to microprocessor 120 over output channels 132, 142, and 152, respectively, and over input channels 134, 144, and 154, respectively. Each of host bridges 130, 140, and 150 comply with the HyperTransport™ I/O Link Specification, Revision 1.03, © 2001 HyperTransport Technology Consortium, and are able to achieve a throughput of 3.2 GB/sec when using a 1600 MHz data rate. HyperTransport technology is a packet-based link implemented on two independent unidirectional sets of wires. So for example host bridge 130 communicates with I/O device 160 over an output connection 132 and an input connection 134. The HyperTransport link is nominally point-to-point and connects two devices. Chains of HyperTransport links can also be used as an I/O channel, connecting I/O devices and bridges to a host system.

The HyperTransport link is designed to deliver a high-performance and scalable interconnect between CPU, memory, and I/O devices. The HyperTransport link uses low swing differential signaling with on-die differential termination to achieve very high data rates. The HyperTransport link uses scalable frequency and data width to achieve scalable bandwidth.

I/O device 160 is an input/output device that functions as a producer of data. In the illustrated embodiment I/O device 160 is a controller that implements the local area network communication protocol standardized by the Institute of Electrical and Electronics Engineers (IEEE) under the auspices of the IEEE 802.3 committee, commonly referred to as "Ethernet". However the present invention is applicable to other data producers as well.

In operation I/O device 160 will periodically receive frames while performing the Ethernet protocol. When a frame has been received, a DMA controller within I/O device 160 will write the data to cache 124 by sending a special WRITE WITH INJECT packet. In this case the data frame consists of two portions, one having protocol header information and the other having payload data. In another embodiment one microprocessor may be responsible for processing the header information while another processor consumes the payload data. However in the one processor system shown in FIG. 4, both the I/O driver and application program run on CPU 120.

The DMA write is performed using the HyperTransport protocol over input 134. Host bridge 130 is responsible for receiving the data and providing it to memory controller 126 through XBAR 128. Memory controller 126 then recognizes the WRITE WITH INJECT attribute of the packet and stores the data in a local buffer. Memory controller 126 sends a probe to CPU 122 to inform it of the presence of data to be written into cache 124. In response to a subsequent prefetch read signal from CPU 122, memory controller 126 forwards the data to CPU 122 for storage in cache 124 without performing a write to and a subsequent read from DRAM 170.

Figure 5:
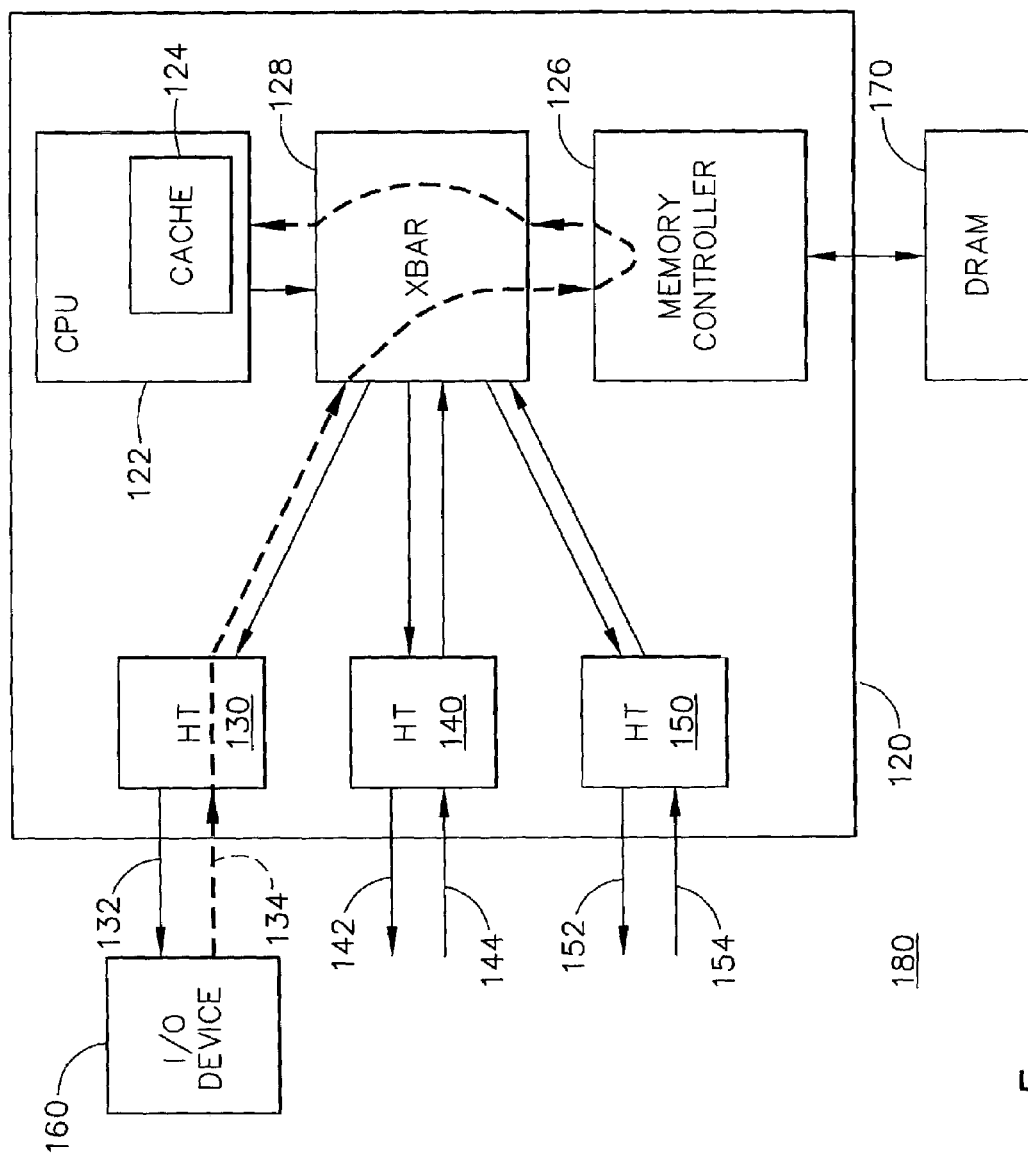
FIG. 5 illustrates a block diagram of the data processing system of FIG. 4 showing the flow of data while performing a write with inject operation.

This operation is better understood with reference to FIG. 5, which illustrates a block diagram 180 of data processing system 100 of FIG. 4 showing the flow of data while performing a WRITE WITH INJECT operation. FIG. 5 shows the flow of data as dashed lines. Thus the data flow starts from I/O device 160, to host bridge 130, through XBAR 128 to memory controller 126, and finally from memory controller 126 through XBAR 128 to CPU 122.

Figure 6:
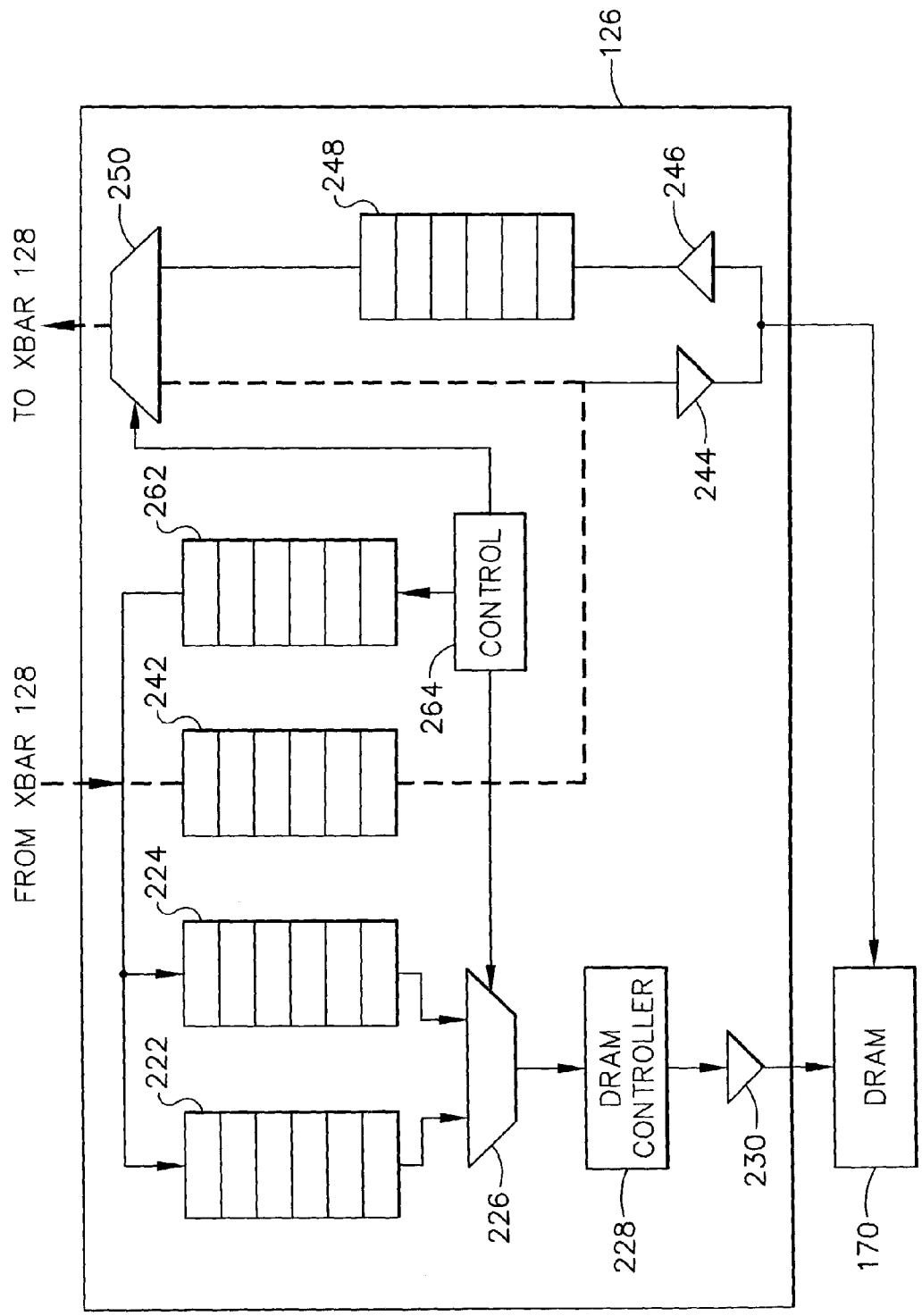
FIG. 6 illustrates a block diagram of a portion of the data processing system of FIG. 4 including the memory controller.

The flow of data during the write with inject operation within memory controller 126 is more specifically described in FIG. 6, which illustrates a block diagram of a portion of data processing system 100 of FIG. 4 including memory controller 126. Memory controller 126 includes generally a set of read request buffers 222, a set of write request buffers 224, a multiplexer 226, a DRAM controller 228, a driver 230, a write data buffer 242, a request ordering buffer 262, a control block 264, drivers 244 and 246, a read data buffer 248, and a multiplexer 250. When memory controller 126 receives a memory access request from XBAR 128, it places the request in read request buffers 222 or write request buffers 224 as appropriate and request ordering buffer 262. These buffers store address and sequence information about the accesses. Control block 264 then controls the order in which requests are read out of buffers 222 and 224 and presented to DRAM controller 228. This mechanism allows memory controller 126 to implement a policy of reads passing older writes since such a policy improves performance. If the access request is a write access, a corresponding buffer in write buffers 242 stores the data to be written to memory. Control block 264 uses the request ordering buffer 262 to align the accesses appropriately. Driver 230 outputs addresses to DRAM 170. Write data is read out of buffers 242 and driven by driver 244 onto the DRAM data bus with the corresponding address. During read operations, read input data is received from DRAM 170 through input driver 246 and stored in read data buffer 248. Control block 264 causes the read data so stored to be passed to CPU 122 through XBAR 128 by selecting the second input of multiplexer 250.

In response to receiving a WRITE WITH INJECT packet, memory controller 126 stores the write address and write data in buffers 224 and 242, respectively. The write buffer combines writes to the same address and snoops all reads. Importantly when a read hits in the write buffer, the data is returned to XBAR 128 through multiplexer 250 and the write buffer entry is de-allocated. If the write buffer fills and the write operation is performed before the prefetch read reaches memory controller 126, then memory controller 126 simply proceeds to read the data from DRAM 170. However, actually storing the data in DRAM 170 is not expected to be a common occurrence when the write buffer is made sufficiently large.

Figure 7:
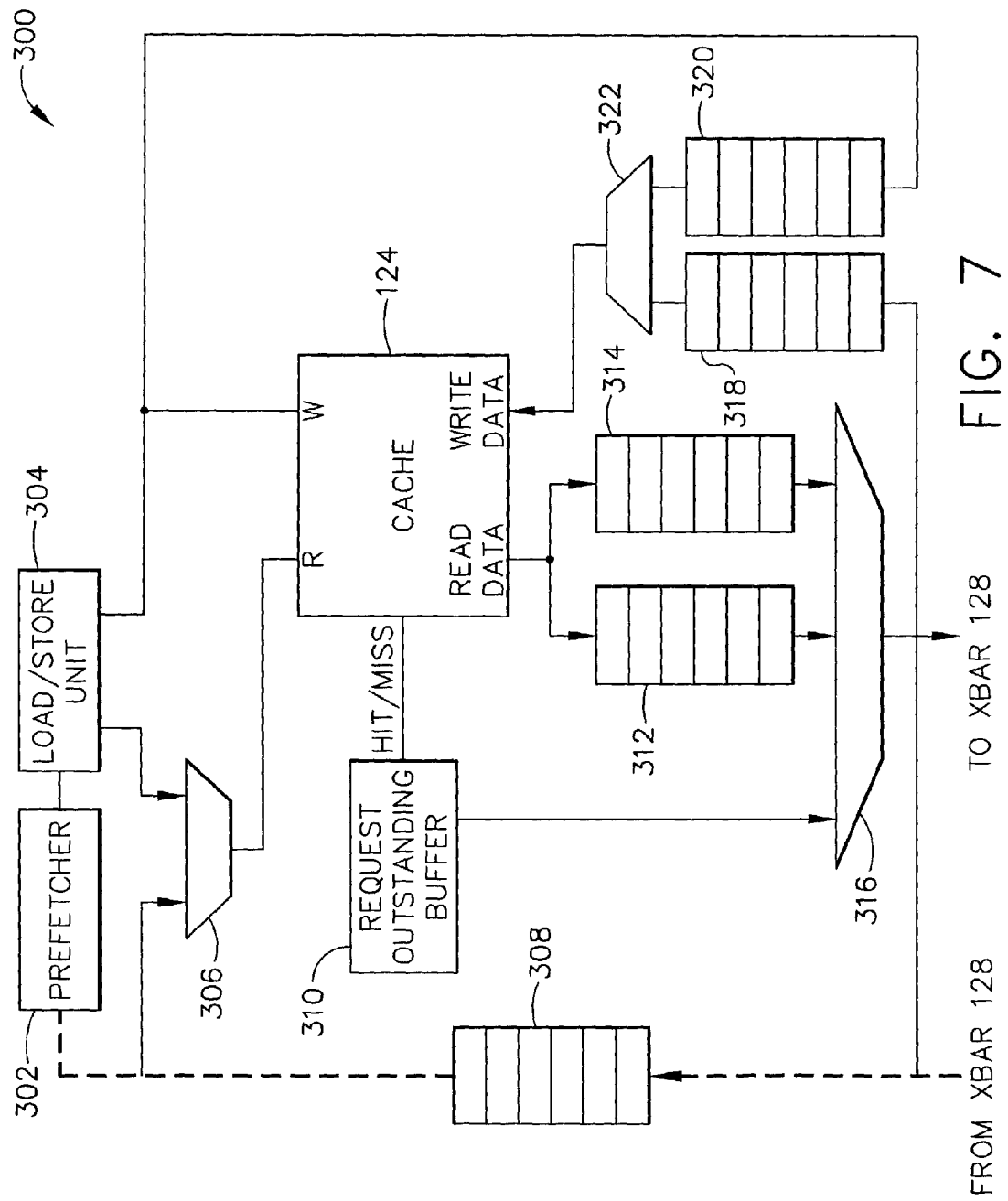
FIG. 7 illustrates a block diagram of a portion of the central processing unit of FIG. 4 including the cache.

FIG. 7 illustrates a block diagram of a portion 300 of central processing unit 122 of FIG. 4 including cache 124. Portion 300 includes a prefetcher 302, a load/store unit 304, a multiplexer 306, a probe buffer 308, a request outstanding buffer 310, a victim buffer 312, a probe response data buffer 314, a multiplexer 316, a read response data buffer 318, a store data buffer 320, a multiplexer 322. Probes are received from XBAR 128 and stored in buffer 308. When processed they can result in a read request from cache 124 through multiplexer 306. If the data is present in the cache, it results in a probe hit. In addition to probe-initiated accesses to cache 124, multiplexer 306 also presents cache read requests generated by load/store unit 304 to the read input of cache 124. In the case of writes, load/store unit 304 provides the address to the write port of cache 124 and places the store data into store buffer 320, where it is input into cache 124 through multiplexer 322. Cache 124 also receives read response data as a result of reads to the lower level memory system and stores such data in read response data buffer 318, where it is input into the write data port of cache 124 through the first input of multiplexer 322.

A probe prefetch that is issued in response to a WRITE WITH INJECT packet follows the path indicated by the dashed line, through probe buffer 308 and into prefetcher 302. In response to the prefetch probe, first CPU 122 issues a probe response through probe response data buffer 314, and then issues a prefetch load to memory controller 126. When the prefetch read data is returned it is stored into buffer 318 and afterward is written into cache 124 through the first input of multiplexer 322 and installed in the appropriate cache line in the modified (M) state. It will be used soon thereafter by the I/O driver software. The line is installed in the M state to assure that it will be written to memory when it is de-allocated using the cache's normal replacement policy such as LRU.

TABLE I illustrates several types of probes and their associated responses available in microprocessor 120:

TABLE I

| Probe Type | Inject attribute | Hit | Victim state | Victim writeback | Install State | DRAM written | Action |
| --- | --- | --- | --- | --- | --- | --- | --- |
| Probe Invalidate |  | N |  | N | Unchanged | Y | No injection |
| Probe invalidate |  | Y | MOES | N | I | Y | No injection |
| Probe | Prefetch | N | ESI | N | M | N | Invalidate victim line in cache, install line in cache |
| Probe | Prefetch | N | MO | Y | M | N | Writeback victim, install line in cache |
| Probe | Prefetch | Y | MOESI | N | M | N | Update line in cache |
| Probe | Prefetch on hit | Y | MOES | N | M | N | Update line in cache |

TABLE I-continued

| Probe Type | Inject attribute | Hit | Victim state | Victim writeback | Install State | DRAM written | Action |
|---|---|---|---|---|---|---|---|
| Probe | Prefetch on hit | N | | N | Unchanged | Y | Line not in cache |

Memory controller 126 issues a probe with the "prefetch" attribute set in response to the WRITE WITH INJECT packet. The action taken by cache 124 varies depending on the victim state as shown in TABLE I.

Figures 8, 11:
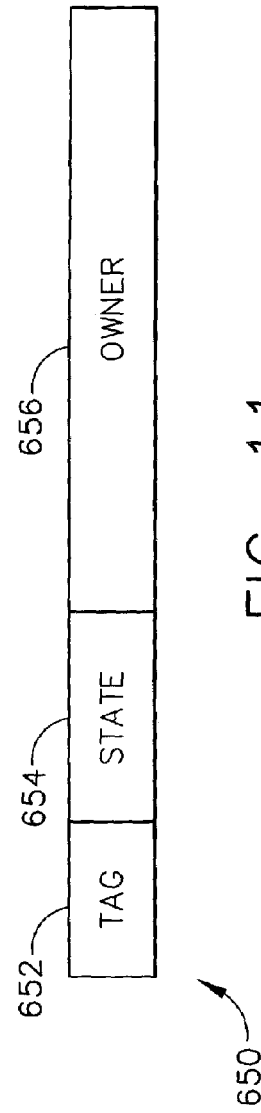
FIG. 8 illustrates an encoding table of a HyperTransport packet that can be used to form a WRITE WITH INJECT packet.
FIG. 11 illustrates an entry in the directory/memory controller of FIG. 10.

FIG. 8 illustrates a diagram of a HyperTransport packet 200 by which I/O device 160 can form a WRITE WITH INJECT packet. The packet structure used is known as the request packet with address. The packet is four bytes long with an additional four-byte address extension. According to the present invention I/O device 160 signals a WRITE WITH INJECT attribute by adding a new WRITE WITH INJECT encoding into the command field as described further below.

The various fields associated with this packet will now be described. SeqID[3:0] (formed by concatenating bits 7 and 6 of Bit-time 0 with bits 6 and 5 of Bit-time 1) is used to tag groups of requests that were issued as part of an ordered sequence by a device and must be strongly ordered within a virtual channel. All requests within the same I/O stream and virtual channel that have matching nonzero SeqID fields must have their ordering maintained. The SeqID value of 0x0 is reserved to mean that a transaction is not part of a sequence. Transactions with this value have no sequence-ordering restrictions, although they may be ordered for other reasons as described in Chapter 6 of the HyperTransport standard.

The Cmd[5:0] field is used to signal various commands in the HyperTransport protocol. The 2001 HyperTransport standard defines various encodings of the Cmd[5:0] field, and reserves other encodings. TABLE II shows the defined and reserved encodings:

TABLE II

| Code | VChan | Command | Comments/Options | Packet Type |
|---|---|---|---|---|
| 000000 | — | NOP | Null packet. Contains flow control information. | Info |
| 000001 | | Reserved-HOST | | |
| 000010 | NPC | Flush | Flush posted writes | Request |
| 000011 | | Reserved-HOST | | |
| 0001xx | | | | |
| x01xxx x01xxx | NPC or PC (bit 5) | Wr (sized) | Write request<br>[5] Defines whether request is posted:<br>0: Nonposted<br>1: Posted<br>[2] Defines the data length:<br>0: Byte<br>1: Doubleword<br>[1] Defines bandwidth/latency requirements:<br>0: Normal<br>1: Isochronous<br>[0] Indicates whether access requires host cache coherence (ignored if access is not to host memory:<br>0: Noncoherent<br>1: Coherent | Req/Addr/Data |
| 01xxxx 01xxxx | NPC | Rd (sized) | Read requests<br>[3] Defines ordering requirements for response:<br>0: Response may not pass posted requests<br>1: Response may pass posted requests<br>[2] Defines the data length:<br>0: Byte<br>1: Doubleword<br>[1] Defines bandwidth/latency requirements:<br>0: Normal<br>1: Isochronous<br>[0] Indicates whether access requires host cache coherence (ignored if access is not to host memory:<br>0: Noncoherent<br>1: Coherent | Req/Addr |
| 100xxx | | Reserved-I/O | | |
| 110000 | R | RdResponse | Read Response | Resp/Data |
| 110001 | | Reserved-HOST | | |
| 110010 | | | | |
| 110011 | R | TgtDone | Tell source of request that target is done. | Response |
| 11010x | | Reserved-HOST | | |

TABLE II-continued

| Code | VChan | Command | Comments/Options | Packet Type |
|---|---|---|---|---|
| 11010x | | Reserved-HOST | | |
| 11011x | | Reserved-I/O | | |
| 11100x | | Reserved-HOST | | |
| 11100x | | Reserved-HOST | | |
| 11100x | | Reserved-HOST | | |
| 111010 | PC | Broadcast | Broadcast message | Req/Addr |
| 111011 | | Reserved-HOST | | |
| 111100 | PC | Fence | Fence posted requests | Request |
| 111101 | NPC | Atomic RMW | Atomic Read-Modify-Write | Req/Addr/Data |
| 111110 | | Reserved-I/O | | |
| 111111 | — | Sync/Error | Link Synchronization and Error Packet | Info |

PassPW indicates that that this packet is allowed to pass packets in the posted request channel of the same I/O stream. Otherwise, this packet must stay ordered behind them. This bit should be cleared to maintain the standard personal computer interface-(PCI-) like ordering model of Hyper-Transport technology. Systems that do not require PCI-like ordering may set PassPW for higher performance.

The UnitID[4:0] field serves to identify participants in a transaction. Since all packets are transferred either to or from the host bridge at the end of the fabric, either the source or destination node is implied. The value 0 is reserved for the UnitID of the host bridge. See Section 4.2 of the 2001 HyperTransport standard for more details on the use of UnitID. Nodes with multiple logical I/O streams can own multiple UnitID values.

The HyperTransport protocol reserves two bytes, transmitted during bit times 2 and 3, to be specific to the command.

Addr[39:2] represents the doubleword address accessed by the request. Not all address bits are included in all request types. Where finer granularity is required, byte masks are used.

I/O device 160 preferably signals the WRITE WITH INJECT request by using any one of the Cmd[5:0] field definitions that are marked "Reserved-I/O". In addition, however, since there are very few reserved command encodings for I/O devices, the new WRITE WITH INJECT packet is preferably combined with other new packet formats using only one Reserved-I/O command encoding. This objective is accomplished by using the four-bit SeqID field to encode additional conditions to differentiate the between the other new packet types.

Figure 9:
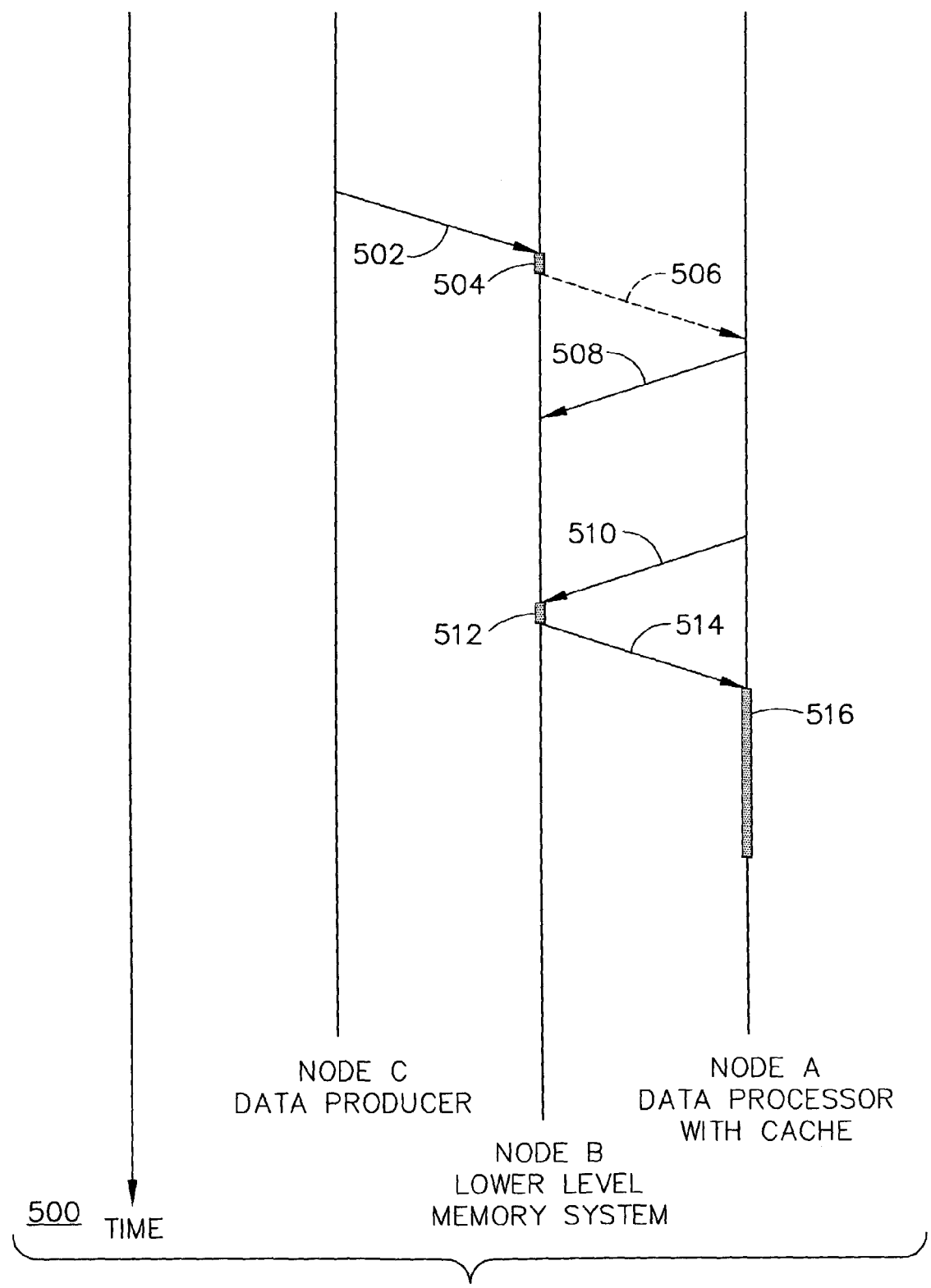
FIG. 9 illustrates a timing diagram associated with the flow of data and control signals in a directory-based data processing system according to the present invention.

FIG. 9 illustrates a timing diagram 500 associated with the flow of data and control signals in a directory-based data processing system according to the present invention. In this embodiment the lower level memory system at NODE B maintains a directory-based cache coherency protocol. As before the data producer, lower level memory system, and processor with cache may all occupy distinct nodes.

In response to a data producer at NODE C providing a WRITE WITH INJECT packet as illustrated by an arrow 502, a directory/memory controller at NODE B checks its directory for the presence of the addressed line in its associated cache or caches (to be explained further below) during a time period 504. If the entry has already been allocated to such cache or caches and is in a particular state (modified or exclusive), as would be the case for a circular buffer used for a communication receiver, then the memory controller sends a probe prefetch represented by an arrow 506 to NODE A to inform it of the presence of data to be injected into the cache at NODE A. Unlike the system of FIG. 2, however, the directory-based system of FIG. 9 keeps track of which processor among all processors in the system has cached the data and sends a directed prefetch to the owner of the data instead of broadcasting the prefetch. NODE A (the owner of the data) responds with a probe response indicated by an arrow 508. Data is held in a store buffer at the memory controller and writing to the lower level memory system is delayed. Later the data processor at NODE A sends a prefetch read to NODE B as represented by an arrow 510. The memory controller of NODE B responds by reading the data element from the store buffer during a time period 512, and sending the data to NODE A as represented by an arrow 514. If the data processor at NODE A is able to send the prefetch read normally, the memory controller of NODE B is able to send the data without accessing main memory at all. However if the memory controller at NODE B needs to re-use the store buffer for another purpose, such as to satisfy a normal write request when all other write buffers are full before the processor sends the prefetch read, then the memory controller will write the data to memory instead. Finally NODE A completes the cache line fill during a time period 516. When the data is subsequently used at NODE A, the cache line will be available for de-allocation during the normal flow of processing using the cache's de-allocation policy, such as least recently used. Since the data element is used by the processor only once, the line will not be modified in the cache and there will be no need to write the line back to main memory. Thus this method normally eliminates any writes to main memory and only consumes a small amount of bandwidth to the memory controller at NODE B to perform the directory read and read buffer operations.

Figure 10:
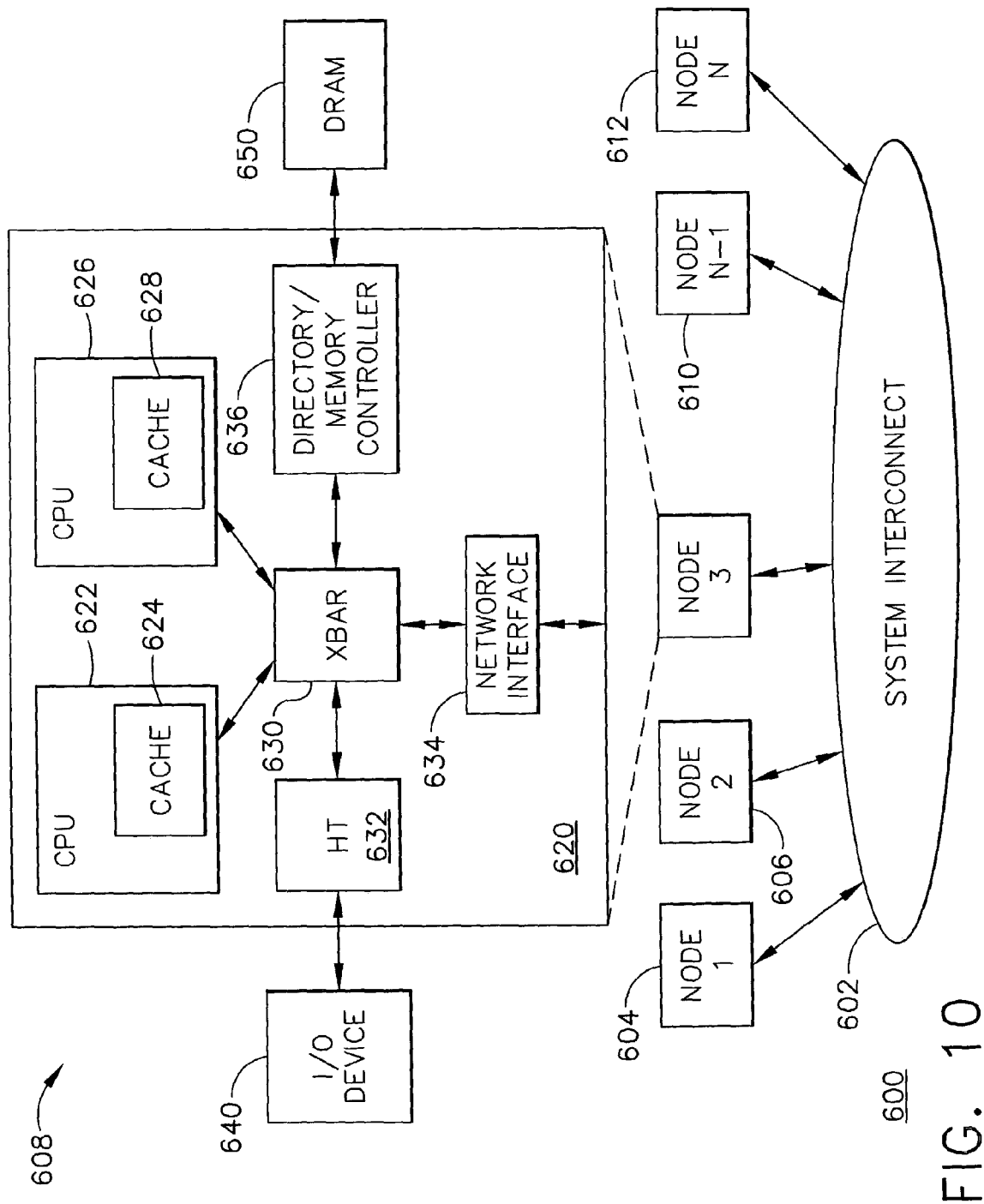
FIG. 10 illustrates a block diagram of a directory-based data processing system according to the present invention.

FIG. 10 illustrates a block diagram of a directory-based data processing system 600 according to the present invention. Data processing system 600 includes N nodes connected together by a system interconnect 602. Illustrated in FIG. 10 are exemplary nodes including nodes 604, 606, 608, 610, and 612 labeled "NODE 1", "NODE 2", "NODE 3", "NODE N–1", and "NODE N", respectively. As an example node 608 is shown in greater detail. Node 608 includes a microprocessor 620 having two CPU cores 622 and 626 with associated caches 624 and 628, respectively, a crossbar switch labeled "XBAR" 630, an I/O controller labeled "HT" 632, a network interface 634, and a directory/memory controller 636. I/O controller 632 is coupled by an external interface to an associated input/output device 640. I/O controller 632 implements the so-called non-coherent HyperTransport protocol. Network interface 634 is coupled to system interconnect 602 and implements the so-called coherent HyperTransport protocol. Directory/memory controller 636 is coupled to a lower level memory system in the form of a DRAM 650.

In operation node 608 implements a cache coherent non-uniform memory access ("CC NUMA") architecture. Each node in the system like node 608 includes processors having CPUs with caches, DRAM controllers, directory controllers, and input/output devices like processor 620. Node 608 can inject write data directly into either of its local caches, or indirectly through system interconnect 602 to a cache located at another node, when the data is already cached in the Modified (M) or Exclusive (E) state. The cache that stores the data is responsible for satisfying subsequent read or write requests to this cache line. The purpose of this caching mechanism is to reduce the DRAM memory bandwidth requirements as shown in FIG. 9 and to deliver DMA write data to any cache in the system when the line is already present in the cache, thereby updating the data already present in the cache.

Node 608 supports three basic states for each line present in the directory. The Invalid (I) state indicates the line is not cached in any cache in the system. A read request to a line in the I state results in an access to the lower level memory system. The Uncached (U) state indicates that the line has been read by a caching agent for a read-only access written back to the lower level memory system and is not cached anywhere in the system. The Modified/Exclusive (ME) state indicates that the line has been read by a caching agent for read/write access. When the directory entry for a particular cache line is in the ME state, the caching agent may have the data in either the E state or the M state in its local cache. If the caching agent has the line in the E state, then it has read/write permission for its copy of the line, but it has not yet written to the line. If the caching agent has the line in the M state, then it has read-write permission for its cached copy of the line and it has already modified the data. When the caching agent has the line in the M state in its cache, then the data in memory is stale. The line is first installed in the caching agent in the E state and subsequently transitions to the M state when it is modified. Exactly one node in the system can have read/write access to the line. Any read request to a line in the ME state at the directory must first check to see where the most up-to-date copy in the system is. If the most recent data is in the processor cache, that processor must supply the line. If the processor has the cache line in the E state, then the line is invalidated (placed in the I state) in the processor cache and is supplied by the memory agent.

When a line in ME state is read, the directory entry transitions to Owned (O) state to indicate that the data in memory is stale and also that there are sharers.

When a cache has a read only copy of the data, no directory entry is allocated. The absence of a directory entry indicates that a line may be cached in the system. Therefore, a store which misses in the sparse directory cache broadcasts probes to all caches to invalidate shared copies.

The availability of the directory allows processor 620 to support the more general case in which NODE A, NODE B, and NODE C in FIG. 9 are distinct without sending broadcast probes to require all caches in the system to check for the presence of the data. Processor 620 uses the directory in directory/memory controller 636 to determine where the line is currently cached. If the line is cached and is in the M or E state, the data from I/O device 640 is deposited into the appropriate cache. Otherwise it is written to memory.

More particularly directory/memory controller 636 implements new directory states to support this mechanism. In response to I/O controller 632 receiving a WRITE WITH INJECT packet to a line without a directory entry, directory/memory controller 636 writes the line to DRAM 650. If and only if a directory entry can be created without eviction of a cache entry (i.e., by replacing a U or I entry), then the directory entry is created in a new state, the WRITTEN (W) state. "Soft allocation" of directory entries is used in this case to avoid the possibility of creating a performance problem due to write injection trashing the working set in the cache. When the CPU subsequently reads the line, the line is installed in another new state, the RESERVATION (R) state and the directory entry transitions from the W state to the R state. A subsequent write to a line installed in the R state is injected directly into the processor cache and the directory entry transitions into yet another new directory state, the MODIFIED (M) state, without performing a write to main memory. The processor provides notification of replacement whenever it overwrites an R entry in its cache.

FIG. 11 illustrates an entry 650 in directory/memory controller 634 of FIG. 10. Each entry like entry 650 has three fields: a TAG field 652, a STATE field 654, and an OWNER field 656. The TAG field is used to associate a directory entry with a physical address. The OWNER field indicates the owner when the line is in the ME or O state. Three additional directory states are required to implement this WRITE WITH INJECT mechanism: the W state, the R state, and the M state. The full set of directory states indicated by the STATE field is listed in TABLE III below, in which new states are shown in italics:

TABLE III

| State | Abbrev. | Description |
| --- | --- | --- |
| Invalid | I | Uncached or clean cached copy. |
| Written | W | Uncached. The line was last written into main memory by a data producer. |
| Reservation | R | There is exactly one clean copy of the data in the processor's cache. Notification of replacement is required. |
| Modified | M | The line is modified in the owner's cache. Data in memory is stale. |
| Modified or Exclusive | ME | The line is modified or exclusive at the owner. |
| Owned | O | Line is shared but memory is stale. A line in O state at the owner must be written back on replacement. |
| Uncached | U | An M line has been written back or an E line has been replaced and so the line is guaranteed to not be cached anywhere in the system. |

To support this directory-based mechanism, one additional processor cache state is introduced, the R state. The full set of processor cache states are listed in TABLE IV in which the new state is shown in italics:

TABLE IV

| State | Abbrev. | Description |
| --- | --- | --- |
| Invalid | I | Uncached or clean cached copy. |
| Reservation | R | There is exactly one clean copy of the data in the processor's cache. Notification of replacement is required. |
| Modified | M | The line is modified in the owner's cache. Data in memory is stale. |
| Exclusive | E | The line is exclusive at the owner. The owner has permission to modify the data without generating a bus transaction. |
| Shared | S | The line is read only. Shared copies may exist. Data in main memory is up-to-date. |

It should be apparent that the foregoing discussion of the WRITE WITH INJECT signaling is specific to the HyperTransport protocol. However in other embodiments of the present invention other methods of signaling the WRITE WITH INJECT condition may be used. For example, special encodings of bits fields, existing or additional input/output pins and the like may be used to signal the WRITE WITH INJECT condition. The WRITE WITH INJECT signaling may be accomplished on other I/O buses, such as PCI, PCI-X, PCIE, by using reserved or vendor specific fields in the I/O DMA read request packet.

While the invention has been described in the context of a preferred embodiment, various modifications will be apparent to those skilled in the art. For example a data processing system using the disclosed method may be applicable to systems interfacing directly to main memory as well as to a lower-level cache. Furthermore the invention is applicable to systems with one or more higher-level caches. Main memory may be constructed using DRAM, SRAM, nonvolatile memory, or any other type of memory. Furthermore several methods of temporarily storing data while waiting for the prefetch read are possible. Accordingly, it is intended by the appended claims to cover all modifications of the invention that fall within the true scope of the invention.

We claim:

1. A data processor comprising:
   a central processing unit including a cache, said central processing unit adapted to initiate a prefetch read in response to receiving a probe prefetch;
   a host bridge coupled to said central processing unit and adapted to receive a write with inject packet for a data element from a data producer; and
   a memory controller coupled to said central processing unit and to said host bridge and adapted to be coupled to a lower level memory system, and having an output coupled to said central processing unit, wherein said memory controller includes a buffer and stores said data element from said host bridge in said buffer, provides said probe prefetch to said central processing unit in response to receiving said data element, and provides said data element from said buffer in response to a prefetch read from said central processing unit.

2. The data processor of claim 1 wherein said central processing unit, said host bridge, and said memory controller are coupled together by means of a crossbar switch.

3. The data processor of claim 1 wherein said host bridge is adapted to be coupled to said data producer using a link substantially compatible with the I/O Link Specification, Revision 1.03 of the HyperTransport Technology Consortium.

4. The data processor of claim 1 wherein said memory controller temporarily stores data in said buffer before providing it to said lower level memory system, and wherein said memory controller removes said data element from said buffer without writing said data element to said lower-level memory system if said central processing unit reads said data element before said memory controller writes it to memory.

5. The data processor of claim 1 wherein said central processing unit, said host bridge, and said memory controller are combined into a single integrated circuit.

6. A data processor comprising:
   a central processing unit including a cache;
   a host bridge coupled to said central processing unit and adapted to receive a write with inject packet for a data element from a data producer at an input of the data processor; and
   a directory/memory controller coupled to said central processing unit and to said host bridge and adapted to be coupled to a lower-level memory system over a bus separate from the input, and having an output coupled to said central processing unit, wherein said directory/memory controller is responsive to said write with inject packet to check a directory thereof to see if a cache state of a line associated with said data element is in a predetermined state, and if so to send said data element to said central processing unit for storage in said cache without accessing said lower-level memory system.

7. The data processor of claim 6 wherein said central processing unit, said host bridge, and said directory/memory controller are coupled together by means of a crossbar switch.

8. The data processor of claim 6 wherein said directory/memory controller temporarily stores data in a buffer before providing it to said lower-level memory system, and wherein said directory/memory controller removes said data element from said buffer without writing said data to said lower-level memory system if said central processing unit reads said data element before said memory controller writes it to memory.

9. The data processor of claim 6 wherein said central processing unit, said host bridge, and said directory/memory controller are combined into a single integrated circuit.

10. A data processor comprising:
    a central processing unit including a cache;
    a host bridge coupled to said central processing unit and adapted to receive a write with inject packet for a data element from a data producer at an input of the data processor; and
    means coupled to said central processing unit, to said host bridge, and adapted to be coupled to a lower-level memory system over a bus separate from the input for forwarding, in response to said write with inject packet, said data element to said central processing unit for storage in said cache without accessing said lower-level memory system.

11. The data processor of claim 10 wherein said central processing unit is adapted to initiate a prefetch read in response to receiving a probe prefetch and said means for forwarding comprises a memory controller including a buffer, wherein said memory controller stores said data element from said host bridge in said buffer, provides said probe prefetch to said central processing unit in response to receiving said data element, and provides said data element from said buffer in response to said prefetch read from said central processing unit.

12. The data processor of claim 11 wherein said memory controller temporarily stores data in said buffer before providing it to said lower level memory system, and wherein said memory controller removes said data element from said buffer without writing said data element to said lower-level memory system if said central processing unit reads said data element before said memory controller writes it to memory.

13. The data processor of claim 10 wherein said means for forwarding comprises a directory/memory controller, wherein said directory/memory controller is responsive to said write with inject packet to check a directory thereof to see if a cache state of a line associated with said data element is in a predetermined state and is owned by said cache, and if so to send said data element to said central processing unit for storage in said cache without accessing said lower-level memory system.

14. The data processor of claim 13 wherein said directory/memory controller temporarily stores data in a buffer before providing it to said lower-level memory system, and wherein said directory/memory controller removes said data element from said buffer without writing said data element to said lower-level memory system if said central processing unit reads said data element before said directory/memory controller writes it to memory.

15. The data processor of claim 10 wherein said central processing unit, said host bridge, and said means for forwarding are coupled together by means of a crossbar switch.

16. The data processor of claim 10 wherein said host bridge is adapted to be coupled to said data producer using a link substantially compatible with the I/O Link Specification, Revision 1.03 of the HyperTransport Technology Consortium.

17. The data processor of claim 10 wherein said central processing unit said host bridge, and said means for forwarding are combined into a single integrated circuit.

18. In a data processing system having a memory hierarchy including a cache and a lower-level memory system coupled to the cache over a bus, a method comprising the steps of:
  receiving a data element having a write with inject attribute associated therewith from a data producer at an input separate from the bus;
  forwarding, in response to the write with inject attribute, said data element to the cache without accessing the lower-level memory system; and
  updating at least one cache line containing said data element in the cache.

19. The method of claim 18 wherein the data element includes a value representative of the write with inject attribute.

20. The method of claim 18 wherein said step of receiving said data element comprises the step of receiving said data element at an input of a microprocessor.

21. The method of claim 18 wherein said step of receiving said data element comprises the step of receiving at least a portion of a data communication frame.

22. The method of claim 18 wherein said step of receiving said data element comprises the step of receiving said data element with said write with inject attribute using a link substantially compatible with the I/O Link Specification, Revision 1.03 of the HyperTransport Technology Consortium.

23. The method of claim 22 wherein said step of receiving further comprises the step of detecting the write with inject attribute from a reserved command field encoding in a request packet.

24. The method of claim 18 further comprising the step of performing said steps of forwarding said data element to the cache and updating at least one cache line containing said data element in the cache only if the cache is the owner of said data element.

25. The method of claim 18 wherein said step of forwarding comprises the step of temporarily storing said data element in a buffer.

26. The method of claim 25 further comprising the step of performing said step of forwarding conditionally depending upon whether the data processing system requires said buffer for another purpose before said step of forwarding is performed.

27. The method of claim 25 wherein said step of forwarding further comprises the steps of:
  sending a probe prefetch to a central processing unit coupled to the cache;
  issuing a read request by the central processing unit in response to said probe prefetch sending said data element to the cache in response to said read request; and
  removing said data element from said buffer.

28. The method of claim 27 wherein said step of sending said probe prefetch comprises the step of sending a broadcast probe prefetch to a plurality of nodes in the data processing system.

29. The method of claim 27 wherein said step of sending said probe prefetch comprises the step of sending a directed probe prefetch to a node associated with the cache.

30. The method of claim 18 wherein said step of forwarding comprises the step of checking a directory associated with the cache and sending said data element to the cache only if said at least one cache line is owned by the cache and is present in the directory in a predetermined state.

31. The method of claim 30 wherein said step of updating said at least one cache line further comprises the step of updating said at least one cache line only if said at least one cache line is present in the directory in a reserved state or a modified state.

32. The method of claim 18 wherein said step of updating comprises the step of marking said at least one cache line as modified.

33. The method of claim 18 further comprising the step of reading said data element from the cache using an I/O driver program executing on a central processing unit.

34. A method for use in a data processing system having a plurality of nodes each including a central processing unit and an associated cache comprising the steps of:
  receiving a write with inject packet having a data element associated therewith from a data producer;
  checking a directory to see if said data element is already present in said directory in a predetermined state;
  if said data element is not present in said directory in said predetermined stat; creating a directory entry for said data element and writing said data element to a lower-level memory system; and
  if said data element is already present in said directory in said predetermined state, forwarding said data element to a cache that is the owner of said data element without accessing said lower-level memory system.

35. The method of claim 34 wherein said step of creating said directory entry comprises the step of creating said directory entry in a written state.

36. The method of claim 35 further comprising the step of changing said directory entry from said written state to a reservation state in response to a central processing unit associated with said cache reading said data element.

37. The method of claim 36 wherein said step of checking said directory comprises the step of checking said directory to see if said data element is present in said directory in said reservation state.

38. The method of claim 37 further comprising the step of changing said directory entry from said reservation state to a modified state in response to said step of forwarding said data element to said cache and to said cache updating at least one cache line associated with said data element.

39. The method of claim 38 where said step of checking said directory further comprises the step of checking said directory to see if said data element is present in said directory in said modified state.

40. The method of claim 34 wherein said step of forwarding comprises the step of temporarily storing said data element in a buffer.

41. The method of claim 40 further comprising the step of performing said step of forwarding conditionally depending upon whether the data processing system requires said buffer for another purpose before said step of forwarding is performed.

42. The method of claim 41 wherein said step of forwarding further comprises the steps of:

sending a probe prefetch to a central processing unit associated with said cache;

receiving a read request by said central processing unit in response to said probe prefetch;

sending said data element to said cache in response to said read request; and removing said data element from said buffer.

43. The method of claim 42 wherein said step of sending said probe prefetch comprises the step of sending a directed probe prefetch to a node having a cache that is the owner of said data element.

* * * * *